US005193791A

United States Patent [19]

Schwarz

[11] Patent Number: 5,193,791

[45] Date of Patent: Mar. 16, 1993

[54] THREE POINT PARALLELS

[76] Inventor: Willi B. Schwarz, 14551 Mango, Irvine, Calif. 92714

[21] Appl. No.: 916,890

[22] Filed: Jul. 20, 1992

[51] Int. Cl.[5] .............. B23Q 1/04

[52] U.S. Cl. .............. 269/268; 269/277

[58] Field of Search .............. 269/264, 265–270, 269/277, 279–284, 286; 279/1 SJ, 123, 110

[56] References Cited

U.S. PATENT DOCUMENTS

| | | | |
|---|---|---|---|
| 1,994,422 | 3/1935 | Sasek . | |
| 2,392,310 | 1/1946 | Chrestoff | 269/265 |
| 2,409,936 | 10/1946 | Hunt . | |
| 2,485,876 | 10/1949 | Guest . | |
| 2,553,802 | 5/1951 | Woods . | |
| 2,643,563 | 6/1953 | Gaudreau | 269/280 |
| 2,938,414 | 5/1960 | Blomme . | |
| 4,632,375 | 12/1986 | Yang | 269/265 |
| 4,706,973 | 11/1987 | Covarrubias et al. | 269/266 |
| 4,711,439 | 12/1987 | Campbell . | |
| 4,767,110 | 8/1988 | Yang . | |
| 4,804,171 | 2/1989 | Dornfeld . | |
| 4,834,356 | 5/1989 | Fox . | |
| 4,854,568 | 8/1989 | Baeza et al. . | |
| 4,928,938 | 5/1990 | Ross | 269/277 |

FOREIGN PATENT DOCUMENTS

| | | | |
|---|---|---|---|
| 741434 | 12/1932 | France | 269/279 |

*Primary Examiner*—Robert C. Watson
*Attorney, Agent, or Firm*—James G. O'Neill

[57] ABSTRACT

A means and method for accurately and securely holding workpieces between the jaws of a vise is disclosed. It consits of a system comprising a pair of three point parallels, either used alone, in pairs, or in predetermined arrangements with other devices, to securely clamp substantially any shaped workpiece against the fixed jaw of substantially any vise, in substantially any arrangement, including at selected angles.

20 Claims, 2 Drawing Sheets

THREE POINT PARALLELS

BACKGROUND OF THE INVENTION

1. Field of the Invention

The subject invention relates generally to devices for clamping workpieces in a vise and, more particularly, to modified parallels for use in simply and elegantly, accurately clamping and positioning workpieces in any vise.

2. Description of Related Art

It is common for a machinist to expend considerable time and effort in "squaring" stock prior to other machining operations. In general, the surfaces of stock as received from a mill deviate somewhat from flat, parallel and/or square. At least three adjacent faces (the X, Y, and Z planes) must generally be brought to a flat, square and parallel condition prior to performing other machining operations. To accomplish this, a universal device for clamping various shaped workpiece properly and securely in various vises, without damaging the workpiece, and to enable the workpiece to be easily squared in such vises, has long been sought by machinists and others.

Currently, in the machining industry, standard "parallels", consisting of various size, elongated rectangular steel bars that have been hardened and ground, are generally used for work-holding applications in machine vises. These rectangular parallels are normally used by placing them in the vise, setting selected angles. Additionally, since there is an inherent tendency for the movable jaw of a vise to lift the workpiece slightly as the vise is tightened, either against the workpiece directly, or against the standard parallels, the standard rectangular parallels do not compensate for this lifting. Furthermore, these standard parallels do not press on a strategic point of a workpiece being clamped, to allow the workpiece to "tilt" or "rock" so as to align the workpiece against the fixed or solid jaw of the vise, or down against the bottom of the vise, as the case may be. Machinists, therefore, have to take special, time consuming steps to attempt to compensate for this lifting, and/or failure to rock or tilt, of a workpiece, as the movable jaw of a vise is tightened against it.

Some experienced machinists try to use full round bars or hardened (spherical) tooling balls in an attempt to clamp irregular workpieces in position to compensate for lifting, and to make sure the workpiece sits flat against the solid vise jaw, and/or down against the bottom of the vise. But, even when using these devices, it is quite difficult, if not impossible, to quickly, easily and reliably clamp even fully squared workpieces in a vise. Furthermore, it is generally impossible to properly clamp irregular or odd shaped workpieces with these devices.

Many other holding devices which support workpieces in vises, such as angle blocks, support or holding apparatus, V-blocks, vise jaw faceplates, and the like, are also known. Additionally, some vises are provided with movable jaw sections, or an integral, angularly movable jaw, or related parts, to facilitate holding specifically shaped workpieces, or workpieces at desired angles.

However, a disadvantage of the above mentioned workpiece holding devices is that they are limited for use in specific circumstances, cannot be used in all vises and with all workpieces, and cannot quickly or easily, if at all, compensate for jaw lifting, nor do they locate the pressure point in a position aqainst the workpiece where it allows the workpiece to align itself against the fixed or solid jaw of a vise, or down against the bottom of the vise, as mentioned above.

A further disadvantage of these present holding devices, is that they are complicated, not always easy to use, and are not low enough in cost to be adapted for use in particular vises, or to simply and easily, accurately hold workpieces in a vise, without damaging such workpieces.

U.S. Pat. Nos. 1,994,422, 2,409,936, 2,485,876, 2,553,802, 2,938,414, 4,711,439, 4,767,110, 4,804,171, 4,834,356 and 4,854,568 disclose some prior art devices of the type discussed above, for holding workpieces in a vise. However, none of these prior art devices disclose an apparatus, system or method for quickly, reliably and precisely positioning and clamping various workpieces in substantially any vise, between the jaws of such device, as provided by the present invention.

SUMMARY OF THE INVENTION

Accordingly, it is a general object of the present invention to provide a means for accurately holding a workpiece 10 between the jaws of a standard vise. It is a more particular object of the present invention to provide a pair of specifically shaped bars for placement in a vise for accurately holding a workpiece between the jaws thereof. It is yet another object of the present invention to provide a pair of specifically shaped bars that are adapted to be used with other readily available devices for quickly and accurately positioning and holding a workpiece between the jaws of a vise. It is a still further object of the present invention to provide a system comprised of a specifically shaped bar that may be used alone, in pairs, and/or with other devices to accurately position and hold a workpiece between the jaws of a vise. And it is yet a further object of the present invention to provide a three point parallel bar system for placement between the jaws of a vise in a variety of arrangements to position and hold various workpieces in specific alignments in the vise.

In accordance with the present invention there is provided a means and method for accurately and securely holding workpieces between the jaws of a vise, consisting of a modified "parallel", having three locating points, used alone, in pairs, or in arrangements with other devices (hereinafter called a "three point parallel", or "three point parallels"). These three point parallels allow secure clamping of irregular shaped workpieces against the fixed jaw of a vise, in substantially any arrangement; and allowing such a workpiece to "tilt" itself into proper alignment or position against the solid jaw of a vise, or the bottom of the vise, because of the arcuate shape of the third locating point of the parallel.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 B is a partial left side elevational view of the three point parallel of FIG. 1;

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a means and method for quickly and easily, accurately and securely, positioning and holding various workpieces in a vise.

Figure 1A:
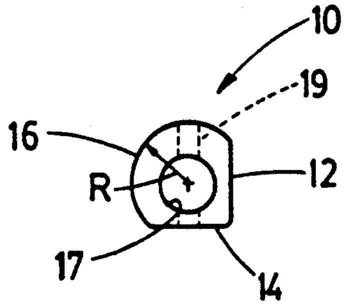
FIG. 1 A is an end elevational view of a single three point parallel of th invention.
Figure 1B:
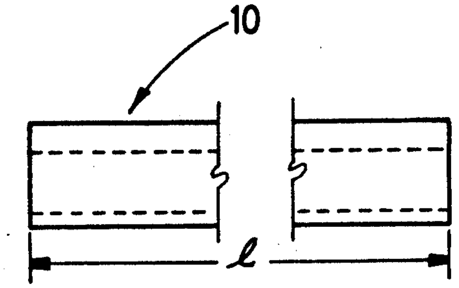

Turning first to FIGS. 1 A and 1 B, there shown is a three point parallel device 10 for use in positioning and securing workpieces in vises. The three point parallel device 10 is basically a specifically shaped loose elongated bar means that may be quickly and easily used by being dropped or placed between the jaws of substantially any available vise. The device of the present invention may be used alone or in pairs, with or without a further device or workpiece holding means, of a type known to those skilled in the art. The three point parallel 10 includes an elongated body having three distinct exterior surface areas extending along the entire length thereof. Two of these distinct exterior surface areas are comprised of accurately machined and finished, flat exterior side surface portions 12 and 14, preferably meeting each other at an angle, at a single corner. The angle of meeting at this single corner is preferably 90°. The machining, finishing and heat treating of these flat exterior side surface portions, can be accomplished in any manner known to those skilled in the art, to provide these flat side surface portions with extremely close tolerances, so as to be at least as square and flat as known parallels, or other workpiece holding and/or positioning devices. The third distinct exterior surface portion is comprised of an arcuate portion 16, which connects together the outer ends (opposite from the single corner where the flat side surfaces meet) of each of the flat, finished exterior side surface portions 12 and 14, at two further corners, to thereby complete the exterior of the three point parallel 10. These three distinct surface portions provide a device which is both square and concentric. The exterior surface of the arcuate portion 16 is also finished, in any manner known to those skilled in the art, to provide as smooth, accurate and concentric an outer surface, having a radius R, (shown in FIG. 1 A), as is deemed possible and necessary, for its intended use.

In a preferred embodiment of the modified parallel 10, the elongated length 1 of the device is approximately 6 inches, with the radius R being measured from the centerline of the device to the exterior surface of the arcuate portion 16. Additionally, the height of both flat side surfaces 12 and 14, as shown in FIG. 1A, are preferably, approximately 1.25 R. It is to be further understood, however, that the dimensions of the device 10, such as the height of the flat side surfaces 12 and 14, the length 1, and/or the radius R may be changed to any convenient size, depending on the intended use of the device 10. However, it has been found that the device is preferably used by machinists in pairs, in three standard sizes. These standard sizes all have a length 1 of approximately 6", while the radii R are preferably 0.375", 0.500" and 0.750".

The three point parallels 10 may be made from any known or to be discovered material, but are presently preferably made from a hardened metal or plastic, such as, 01 tool steel having a 62 Rockwell C hardness, with a ground finish, that makes it square and concentric within extremely close tolerances, such as 0.0005".

To lighten the three point parallel 10 for easier use, or to facilitate handling and transport, a central bore 17 can be provided therein, in any known manner, extending along the entire length thereof. In a preferred embodiment of the invention, the central bore 17 is circular, with a radius that is approximately 0.35 R. Additionally, when it is desired to precisely set the positioning angle when using devices 10, a precise hole 19 is formed extending along a diameter therethrough, so that a precision angle meter, of a type known to those skilled in the art, may be mounted to the device, in the hole 19. One or more holes 19 may be formed along the length 1, in any desired location, of any selected size. In a preferred embodiment of the invention, two holes 19 are formed along the length, square to the surfaces 16 and 14, with each of the holes being approximately 3/16 R, in diameter.

Figure 2:
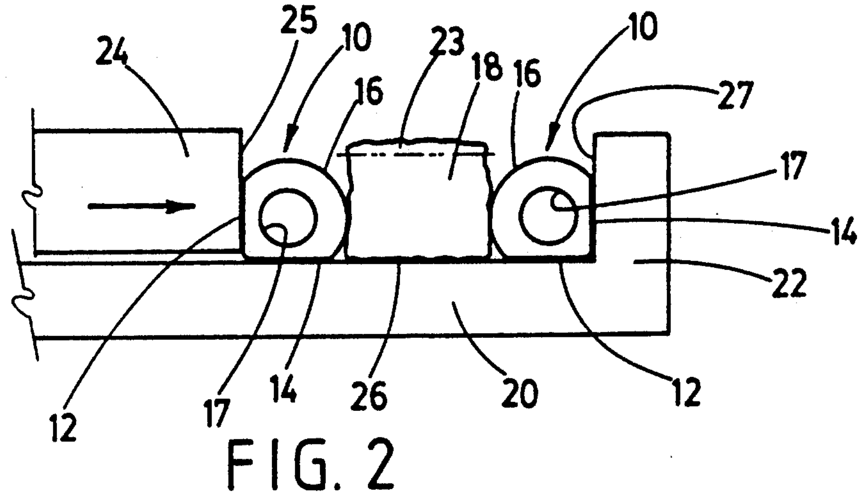
FIG. 2 is a schematic view showing an example of how an irregular workpiece may be securely clamped between a pair of three point parallels in a vise.

Turning now to FIGS. 2 through 6, examples of how three point parallel devices 10 may be used in a vise 20 having a fixed or solid jaw 22 and a movable jaw 24, are set forth. Specifically, FIG. 2 illustrates a workpiece 18, having 4 irregular sides, securely clamped in a vise 20 between the jaws 22 and 24 and a pair of three point parallels 10. By using the pair of three point parallels of the invention, as shown, with the smooth flat surfaces 12 and 14 of each device against a base 26 and flat interior surfaces 25 and 27, respectively, of jaws 24 and 22, while the arcuate surfaces 16 of each device 10 are against opposite irregular sides of workpiece 18, the workpiece is firmly and securely clamped in position with its lower surface held down against base 26. This position is especially important with larger workpieces that already have one side that is flat or close to flat and it is desired to use such a flat side or close to flat side as a reference or starting side. It can be seen that each of the three point parallels 10 contact the workpiece 18 and the vise 20 at three points: namely, a point where the arcuate surface 16 abuts against a side wall of the workpiece, and two further points where the surfaces 12 and 14 abut against the base 26 and one of the interior surfaces 25 or 27 of the jaws 22, 24. This three point contact of each three point parallel will prevent the workpiece 18 from being lifted up when movable jaw 24 is being tightened to clamp the workpiece in position. In this manner, a top surface 23 of workpiece 18 may be more accurately machined when held in the vise 20, without requiring further adjustment or alignment, as is currently the case with known holding and positioning means.

The three point holding and positioning of the workpiece 18 may also be accomplished by changing the orientation of each of the devices 10, such as by rotating each device a predetermined angle depending on the shape and size of a workpiece held in the device. For example, each device 10 may be rotated approximately 120°, so that the corner where the two flat surfaces 12 and 14 meet, is in contact with an opposite side wall of the workpiece; one of the corners of each of the devices where the arcuate portion 16 meets a flat surface 12 or 14 is resting against the base 26; and the arcuate portion 16 of one of the devices contacts the interior face 25 of movable jaw 24, while the arcuate portion 16 of the other of the devices contacts the interior face 27 of fixed jaw 22.

Figure 3:
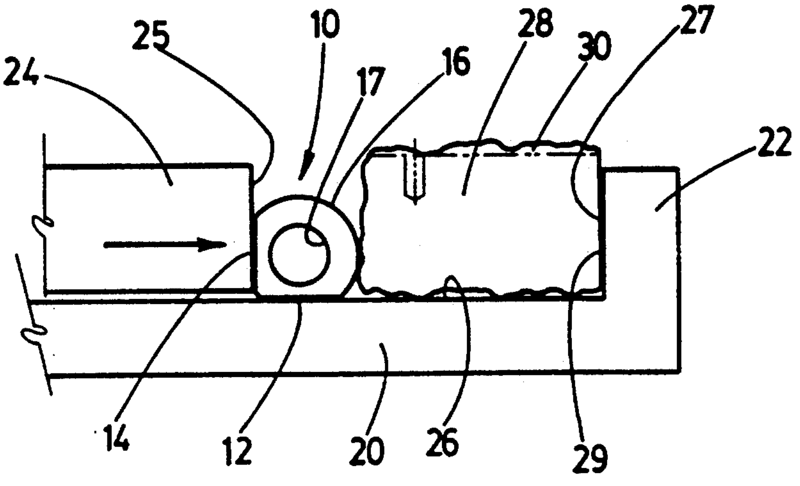
FIG. 3 is a schematic view, similar to FIG. 2, showing an irregular workpiece securely clamped by a single three point parallel in a vise.

FIG. 3 illustrates a workpiece 28, having 3 irregular sides or surfaces, and a machined or flattened and squared side or surface 29, securely clamped in vise 20 between the jaws 22 and 24 and a single three point parallel 10. Because of the arcuate portion 16 of the three point parallel 10, the squared side surface 29 of workpiece 28 is forced against the interior surface 27 of fixed jaw 22, as by rocking or tilting of the workpiece, thereby enabling top surface 30 thereof to be more accurately machined and squared with respect to surface 29. The single three point parallel 10 could also be used to accomplish the same results by rotating it in any desired direction, such as approximately 120 in the counter clockwise direction when looking at the drawing, so that the corner where the two flat surfaces 12 and 14 meet contacts the side wall of the workpiece shown contacted by arcuate portion 16 in the drawing; a further corner of the device, where the arcuate portion meets the end of one of the flat surfaces 12 or 14, contacts the base 26, and arcuate portion 16 contacts the interior surface 25 of movable jaw 24.

Figure 4:
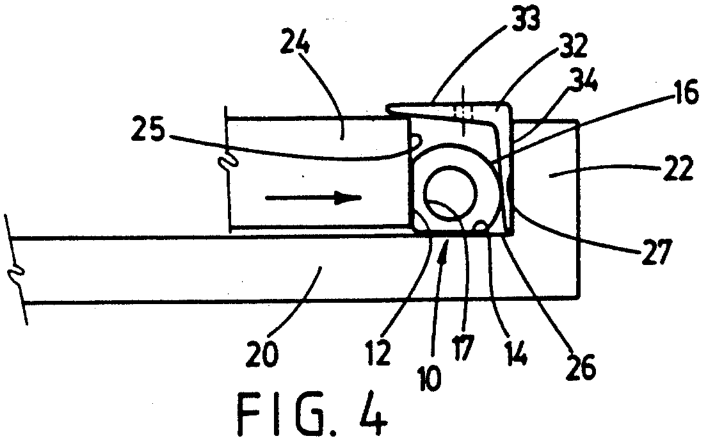
FIG. 4 is a schematic view showing an example of how an extruded structural shaped workpiece may be securely clamped by a single three point parallel in a vise.

Turning now to FIG. 4, there shown is an odd or irregular shaped workpiece, such as an extruded structural shaped workpiece 32 having at least one side or top surface 33 to be machined or operated on. The workpiece 32 is securely clamped in vise 20 between the jaws 22 and 24, by an outer surface 34, which may be previously machined or not, forced against interior face 27 of fixed jaw 22, by means of a single three point parallel 10, in the same manner as explained above. This odd or irregular workpiece 32 will not be damaged, lifted, etc. by movable jaw 24 when being clamped in position, but rocked or tilted to the desired position, thereby enabling top surface 33 thereof to be more accurately and easily machined, when held in the vise 20, as shown. If the extruded structural shaped workpiece 32 is to be clamped in the vise 20 with a surface 33 or 34 of one of its legs against the base 26 to machine an end of the other of the legs thereof, and the leg captured within the vise is longer than the space provided by the single three point parallel 10 and the thickness of the other leg, a further device, such as a standard parallel, may be placed between the interior surface 25 of movable jaw 24 and a flat surface of the three point parallel 10 resting against the interior surface of the upstanding leg of the extruded structural shaped workpiece 32.

Figure 5:
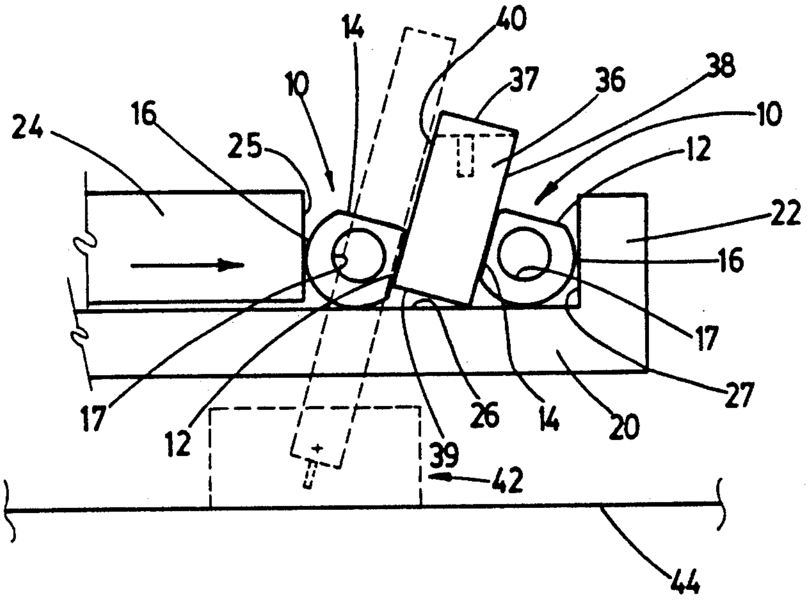
FIG. 5 is a schematic view showing an example of how a workpiece may be securely clamped between a pair of three point parallels, at an angle, in a vise.

FIG. 5 shows a workpiece 36, having 4 sides or surfaces 37, 38, 39 and 40, which may be squared or not, securely clamped in a vise 20, at an angle between the jaws 22 and 24 and a pair of three point parallels 10. By using the pair of three point parallels of the invention, as shown, with one of the smooth flat surfaces 12 and 14 of each pressed against opposite side surfaces 38 or 40 of the workpiece 36, and arcuate surfaces 16 of each device 10 against the flat interior surfaces 25 and 27, respectively, of jaws 24 and 22, the workpiece is firmly and securely clamped in any required angular position. The lower surface 39 of the workpiece 36 will, of course, be held at an angle to base 26. With the workpiece 36 securely held at the desired angle between the jaws 22 and 24, the top surface 37 thereof may be accurately machined or operated on at the desired angle with respect to the remaining surfaces 38, 39 and 40 thereof. This method of securing the workpiece 36 at an angle in the vise is easily and quickly performed. Furthermore, the angle of the workpiece 36 may be easily adjusted and conformed in a variety of ways, such as by the use of a protractor 42, shown in broken line, set onto a machine table 44, in a manner known to those skilled in the art. It can be seen that by holding the workpiece 36 between two parallel three point devices of the present invention, the workpiece can be easily adjusted to and securely held at the desired angle, such as, for example, approximately 15° to each side of a vertical line passing therethrough, or an approximately 30° total range of adjustment, without requiring the use of further devices or tools, and/or adjustment or alignment, as is currently the case with known holding and positioning means.

Figure 6:
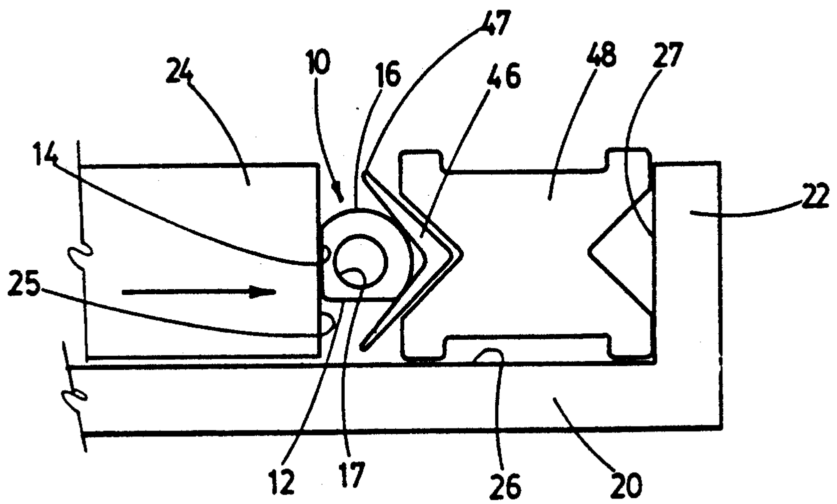
FIG. 6 is a schematic view showing an example of how a workpiece may be securely clamped between a single three point parallel and a standard V-block, at an angle, in a vise.

Turning now to FIG. 6, there shown is an extruded structural shaped workpiece 46, similar to workpiece 32, having an edge 47 to be machined or operated on. The workpiece 47 is securely clamped between the jaws 22 and 24 of vise 20, sandwiched between a standard V-block 48 and a single three point parallel 10. Because of the use of the three point parallel 10, this odd or irregular workpiece 46 will not be damaged, lifted, etc. by movable jaw 24 when being clamped in position, thereby enabling edge 47 thereof to be more accurately and easily machined, when held in the vise 20, as shown. The three point parallel 10 could, of course be rotated within the device to hold workpiece 46 in different positions, or for use with other odd or irregular shaped workpieces.

Those skilled in the art will appreciate that various adaptations and modifications of the just-described preferred embodiment and examples can be configured without departing from the scope and spirit of the invention. Therefore, it is to be understood that, within the scope of the appended claims, the invention may be practiced other than as specifically described herein.

What is claimed is:

1. In combnation with a vise having a fixed jaw and a movable jaw, a pair of workpiece holding devices adapted to be used together and loosely inserted in said vise to support and clamp a workpiece in said vise between said fixed jaw and said movable jaw; each of the workpiece holding devices comprising:

an elongated bar having a finished, exterior surface consisting of three distinct areas extending along the entire length thereof, two of said three distinct areas being finished, flat surface portions connected together at an angle to form a corner; and the third of said three distinct areas being formed as a finished arcuate exterior surface connected to further ends of said finished, flat surface portions at corners, away from the corner formed where said two finished, flat surface portions are connected together at an angle.

2. The combination of claim 1 wherein said finished arcuate exterior surface of each workpiece holding device has a radius R, and said two finished, flat surface portions of each workpiece holding device have lengths of approximately 1.25 R.

3. The combination of claim 2 wherein each workpiece holding device is approximately 6 inches in length and said radius R is between 0.375 and 0.075 inches.

4. The combination of claim 3 wherein each workpiece holding device is made from a material selected from hardened metal and plastic.

5. The combination of claim 3 wherein each workpiece holding device is made from type-01 tool steel, having a 63 Rockwell C hardness with a ground finish.

6. The combination of claim 1, further including an internal bore formed in and extending along the entire length of each workpiece holding device.

7. The combination of claim 4 wherein said finished arcuate exterior surface of each workpiece holding device has a radius R, said two finished, flat surface portions of each workpiece holding device have lengths of approximately 1.25 R, and said internal bore of each workpiece holding device is circular with a radius of approximately 0.35 R.

8. The combination of claim 7 wherein each workpiece holding device is approximately 6 inches in length and said radius R of each workpiece holding device is between 0.375 and 0.750 inches.

9. The combination of claim 8 wherein each workpiece holding device is made from a material selected from hardened metal and plastic.

10. The combination of claim 8 wherein each workpiece holdingd evice is made from type-01 tool steel, having a 62 Rockwell C hardness with a ground finish.

11. The combination of claim 1, further including a precise hole formed passing through each workpiece holding device along a diameter thereof to allow a precision angle meter to be inserted therein to more precisely measure the angle a workpiece is held in said vise by said pair of workpiece holding devices.

12. A pair of workpiece holding devices adapted to be used together and loosely inserted and held in a vise, having a fixed jaw and a movable jaw, to support and clmap an irregular workpiece between said fixed jaw and said movable jaw; each of teh workpiece holding devices comprising:

an elongated bar having a finished, exterior surface consisting of three distinct areas extending along the entire length thereof, two of said three distinct areas being finished, flat surface portions connected together at an angle to form a corner;

the third of said three distinct areas being formed as a finished arcuate exterior surface connected to further ends of said finished, flat surface portions at corners, away from the corner formed where said two finished, flat surface portions are connected together at an angle; and each of the workpiece holding devices lacking any fastening means thereon capable of being used to fasten the workpiece holding device to a jaw of a vise into which it is inserted.

13. The pair of workpiece holding devices of claim 12 wherein asid finished arcuate exterior surface of each workpiece holding device has a radius R, and said two finished, flat surface portions of each workpiece holding device have lengths of approximately 1.25 R.

14. The pair of workpiece holding devices of claim 13 wherein each workpiece holding device is approximately 6 inches in length and said radius R is between 0.375 and 0.075 inches.

15. The pair of workpiece holding devices of claim 14 wherein each workpiece holding device is made from a material selected from hardened metal and plastic.

16. The pair of workpiece holding devices of claim 14 wherein each workpiece holding device is made from type-01 tool steel, having a 62 Rockwell C hardness with a ground finish.

17. The pair of workpiece holding devices of claim 12, further including an internal bore formed in and extending along the entire length of each workpiece holding device.

18. The pair of workpiece holding devices of claim 17 wherein said finished arcuate exterior surface of each workpiece holding device has a radius R, said two finished, flat surface portions of each workpiece holding device have lengths of approximately 1.25 R, and said internal bore of each workpiece holding device is circular with a radius of approximatley 0.35 R.

19. The pair of workpiece holding devices of claim 18 wherein each workpiece holding device is approximately 6 inches in length and said radius R of each workpiece holding device is between 0.375 and 0.75 0 inches.

20. The pair of workpiece holding devices of claim 19 wherein each workpiece holding device is made from a material selected from a hardened metal and plastic; and a precise hole is formed passing through each workpiece holding device along a diameter thereof to allow a precision angle meter to be inserted therein to more precisely measure the angle a workpiece is held in a vise by said pair of workpiece holding devices.

* * * * *

UNITED STATES PATENT AND TRADEMARK OFFICE
CERTIFICATE OF CORRECTION

PATENT NO. : 5,193,791
DATED : March 16, 1993
INVENTOR(S) : Willi B. Schwarz

It is certified that error appears in the above-indentified patent and that said Letters Patent is hereby corrected as shown below:

In item [57] ABSTRACT, line 3, "consits" should be --consists--

Column 1, line 29, should read, --used by placing them in the vise, setting the workpiece on the parallels, and tightening the vise so that the jaws of the vise contact the workpiece directly, or some workpieces may be placed directly in the vise with the parallels on either side of the workpiece, and tightening the vise so that the jaws contact the parallels to clamp the workpiece in position between the parallels. However, these standard rectangular parallels use locating points on only two sides thereof, and do not provide a simple method to hold irregular workpieces. Furthermore, these standard parallels do not allow for easy setup of workpieces at selected angles.--

Column 2, line 23, "workpiece 10" should be --workpiece-- line 66, "th" should be --the present--

Column 5, line 31, "120" should be --120°--

Column 7, line 17, "63" should be --62-- line 21, "4" should be --6--

UNITED STATES PATENT AND TRADEMARK OFFICE
CERTIFICATE OF CORRECTION

PATENT NO. : 5,193,791

DATED : March 16, 1993

INVENTOR(S) : Willi B. Schwarz

It is certified that error appears in the above-identified patent and that said Letters Patent is hereby corrected as shown below:

Column 7, line 36, "holdingd evice" should be --holding device-- line 48, "clmap" should be --clamp-- line 49, "teh" should be --the--

Column 8, line 14, "asid" should be --said-- line 43, "0.75 0" should be --0.750--

Signed and Sealed this

Eighth Day of February, 1994

*Attest:*

Bruce Lehman

BRUCE LEHMAN

*Attesting Officer* *Commissioner of Patents and Trademarks*